US009164269B1

(12) United States Patent
Jahromi (10) Patent No.: US 9,164,269 B1
(45) Date of Patent: Oct. 20, 2015

(54) TELESCOPIC GUN SIGHT WITH ROTATING OPTICAL ADJUSTMENT MECHANISM

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

( * ) Notice: Subject to any disclaimer, the term of this patent is extended or adjusted under 35 U.S.C. 154(b) by 0 days.

(21) Appl. No.: 14/324,605

(22) Filed: Jul. 7, 2014

(51) Int. Cl.
*G01C 9/00* (2006.01)
*G02B 23/02* (2006.01)
*G02B 5/04* (2006.01)

(52) U.S. Cl.
CPC . *G02B 23/02* (2013.01); *G02B 5/04* (2013.01)

(58) Field of Classification Search
CPC ........ G02B 23/02; G02B 23/12; G02B 23/14; G02B 27/64; G01B 11/27; F41G 1/04; F41G 1/38
USPC .......... 356/252, 138, 153, 247; 359/557, 399, 359/429; 42/122, 130
See application file for complete search history.

(56) References Cited

U.S. PATENT DOCUMENTS

| 1,680,534 | A | | 8/1928 | Garbutt et al. |
| 2,458,831 | A | | 1/1949 | Cady |
| 2,534,946 | A | | 12/1950 | Bradley |
| 3,378,687 | A | | 4/1968 | Schepler |
| 3,782,822 | A | * | 1/1974 | Spence ........................... 356/21 |
| 3,918,813 | A | * | 11/1975 | Rossiter ........................ 356/153 |
| 4,118,109 | A | | 10/1978 | Crawford et al. |
| 4,405,203 | A | | 9/1983 | Wallner |
| 6,061,945 | A | | 5/2000 | Wallace et al. |
| 8,294,080 | B2 | | 10/2012 | Rana |
| 8,363,321 | B1 | | 1/2013 | Pochapsky |
| 8,400,700 | B2 | | 3/2013 | Adams et al. |
| 2005/0039370 | A1 | | 2/2005 | Strong |
| 2014/0320962 | A1 | * | 10/2014 | Ando et al. .................... 359/557 |

* cited by examiner

*Primary Examiner* — Hoa Pham (57) ABSTRACT

This invention teaches an optical method for adjusting the point of aim in telescopic gun sights. In one embodiment, a pair of prisms are placed behind the objective lens of a telescopic gun sight such that they can be rotated in a plane perpendicular to the optical axis. The sight's point of aim is adjusted by rotating the two prisms in opposite direction.

4 Claims, 6 Drawing Sheets

TELESCOPIC GUN SIGHT WITH ROTATING OPTICAL ADJUSTMENT MECHANISM

I. CROSS-REFERENCE TO RELATED APPLICATIONS

This application is related to U.S. Pat. No. 8,749,887 issued Jun. 10, 2014.

II. FIELD OF THE INVENTION

This application relates to optical gun sights, specifically to an optical method of adjusting the point of aim in telescopic gun sights.

III. BACKGROUND OF THE INVENTION

A telescopic gun sight or a riflescope is a device used to provide an accurate point of aim for firearms such as rifles, handguns and shotguns. It is used with other types of weapons such as bows and crossbows as well. A telescopic sight can dramatically improve the functionality of a firearm by providing the shooter with a simple yet highly accurate means for aiming at distant targets.

In telescopic sights, the "point of aim" is usually designated by a reticle or cross hairs. Telescopic sights are also equipped with two control knobs for elevation (up-down) and windage (left-right) adjustments. These knobs allow for precise vertical and horizontal movement of the reticle so that the sight's point of aim can be aligned with the firearm's "point of impact".

For descriptions of the conventional mechanical methods commonly used to adjust the reticle within a telescopic sight see, for example, U.S. Pat. No. 2,955,512 issued Oct. 11, 1960 to Kollmorgen et al., U.S. Pat. No. 3,161,716 issued Dec. 16, 1964 to Burris et al., U.S. Pat. No. 5,463,495 issued Oct. 31, 1995 to Murg, and U.S. Pat. No. 5,615,487 issued Apr. 1, 1997 to Tomita.

An optical method for adjusting the point of aim in telescopic gun sights has been disclosed in U.S. Pat. No. 8,749,887 issued Jun. 10, 2014 to the present applicant. This patent teaches the use of two wedge prisms which move linearly along the optical axis for shifting the image formed by the objective on the reticle. This novel optical method overcomes many of the drawbacks associated with the conventional mechanical methods.

The present application teaches an alternative optical method for adjusting the point of aim in telescopic gun sights. Here, counter-rotating wedge prisms mounted in a fixed location on the optical axis are used. This method leads to a more compact solution. Certain optical abberations associated with the linear movement method are also eliminated.

Beam steering using a pair of rotatable wedge prisms is well-known in optical engineering. Such prisms are commonly referred to as Risley prisms after their inventor Dr. Samuel D. Risley (1845-1920). Examples of using Risley prisms for laser beam scanning or steering the field of view of various optical instruments can be found in U.S. Pat. No. 4,118,109 issued Oct. 3, 1978 to Crawford et al., U.S. Pat. No. 3,378,687 issued Apr. 16, 1968 to Schepler, U.S. Pat. No. 4,405,203 issued Sep. 20, 1983 to Wallner, U.S. Pat. No. 6,061,945 issued May 16, 2000 to Wallace et al., U.S. Pat. No. 8,294,080 issued Oct. 23, 2012 to Rana, U.S. Pat. No. 8,363,321 issued Jun. 29, 2013 to Pochapsky, and U.S. Pat. No. 8,400,700 issued Mar. 19, 2013 to Adams et al.

A direct-vision (i.e. non-telescopic) bow sight which uses Risley prisms for adjusting the point of aim has been disclosed in U.S. Pat. No. 2,534,946 issued Dec. 19, 1950 to Bradley. A non-magnifying reflex sight that uses Risley prisms to adjust the point of aim is disclosed in U.S. Pat. No. 2,458,831 issued Jan. 11, 1949 to Cady.

An abandoned patent application by Strong (Appl. Ser. No. 10/638,119 filed on Aug. 8, 2003) discloses a telescopic gun sight that uses rotating prisms for adjusting the sight's point of aim Strong teaches mounting the prisms in front of the objective lens as shown in FIGS. 1 and 2 of his disclosure.

The present invention is distinct from the above mentioned prior art because the rotating prisms are used inside a telescopic sight and are positioned after the objective lens. Implications and advantages of positioning the rotating prims after the objective lens are discussed in detail in subsequent sections.

IV. SUMMARY OF THE INVENTION

In this invention an optical method for elevation and windage adjustment in telescopic gun sights is disclosed. A prismatic optical system comprising a pair of counter-rotating wedge prisms is used to shift the image of the target on the reticle. This method eliminates the drawbacks associated with the prior art and is more compact.

In accordance with one embodiment, this invention introduces a telescopic gun sight comprising an objective lens, a reticle, an image erecting means, an eyepiece lens, and a pair of wedge prisms. The pair of wedge prims are first sandwiched between a negative lens and a positive lens and then mounted between the objective lens and its focal plane. The point of aim of the telescopic sight is adjusted by rotating the prisms around the optical axis in opposite directions.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

FIG. 6(a) is a side view schematic depicting the arrangement of elements in a second embodiment of the invention.

FIG. 6(*b*) is a side view schematic depicting housing and mechanical linkage means according to the second embodiment of the invention.

VI. DETAILED DESCRIPTION OF THE INVENTION

A wedge prism may be used to deviate a monochromatic beam of light by a degrees where $$\alpha = \phi - \xi + \sin^{-1}(n^2 - \sin^2\phi \times \sin\xi - \sin\phi\cos\xi. \quad (1)$$

In the above formula $\alpha$ is the beam deviation angle, $\xi$ is the apex angle of the prism, $\phi$ is the incidence angle of the incoming beam and n is the index of refraction of the glass material used for making the prism. When the incidence light is normal to the prism surface (i.e. $\phi \approx 0$) and for a wedge prism with small apex angle (i.e. $\xi \leq 6°$), (1) can be simplified as $$\alpha \approx (n-1)\xi. \quad (2)$$

Figure 1:
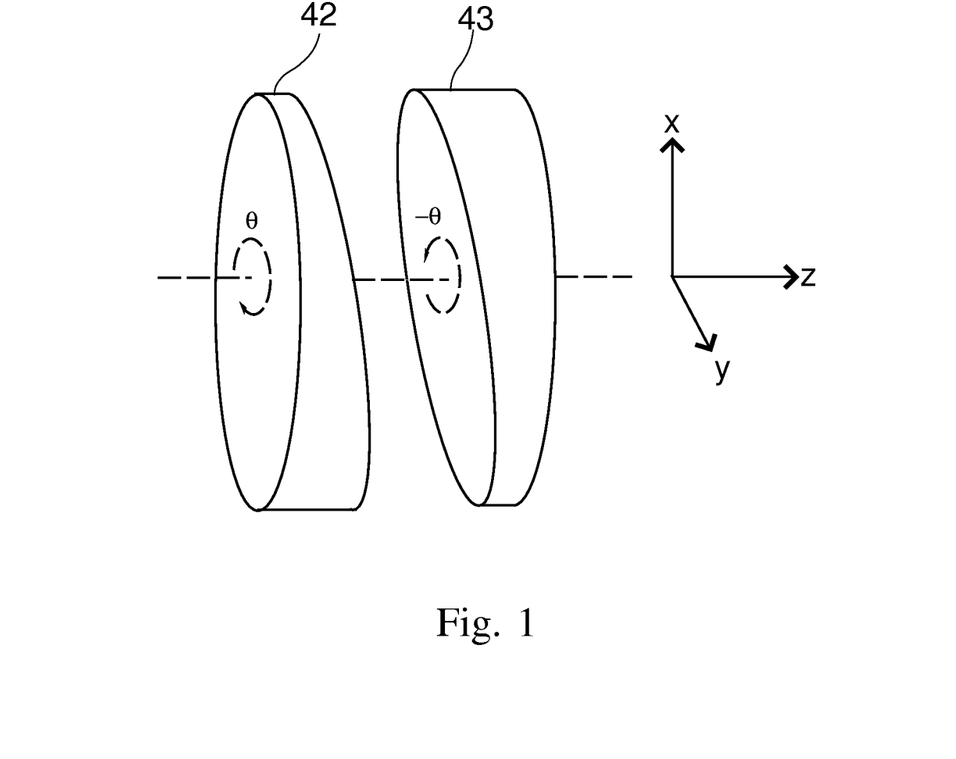
FIG. 1 is a perspective view showing a pair of counter-rotating (Risley) prisms.
Figure 2A:
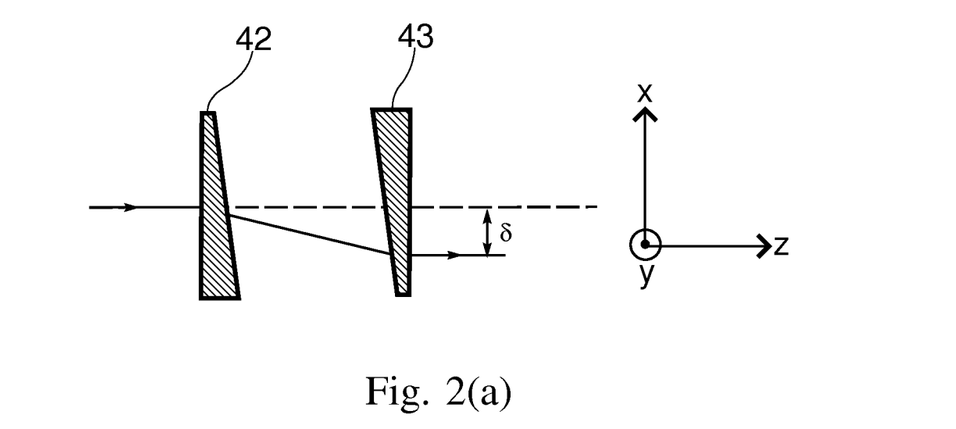
FIG. 2(a) is a side view showing lateral beam deviation characteristics of counter-rotating prims.

This invention uses the Risley beam steering system shown in FIG. 1. The Risley system comprises two identical wedge prisms with small apex angle positioned in tandem. The prisms are mounted such that they are rotatable in the (x, y) plane around the optical axis z. It is assumed that when the rotation angle $\theta$ is zero, the apex of one prism faces the base of the other (See FIG. 2(*a*)). If we rotate the prisms by an equal angle but in opposite directions, the Risley system will deviate light in the y direction only. It is easy to show that, in a first-order approximation, the system's beam deviation is equal to $$\alpha = 2\alpha_0 \sin\theta \quad (3)$$

where $\alpha_0$ is the beam deviation produced by each individual prism and $\theta$ is the rotation angle of each prism.

Example 1 Consider a Risley beam steering system comprising two identical prisms with apex angle $\xi = 4°$ and refraction index n=1.5. From (2) we calculate that the beam deviation of each individual prism will be approximately 2°. If we rotate the prisms in opposite direction and in equal amounts, (3) indicates that any beam deviation angle from $-4°$ to $+4°$ can be achieved. If we limit the rotation range to $-30° < \theta < 30°$, the deviation range of the system will be reduced to $\pm 2°$.

Figure 3A:
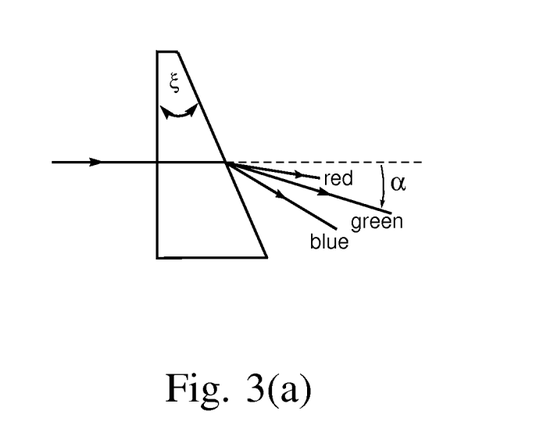
FIG. 3(a) is a side view showing color dispersion in a prism.

A wedge prism deviates light beams of different color at slightly different angles. This is because the refraction index n in (1) depends on the wavelength of the light ray being refracted by the prism. One can obtain the value of n for standard red (C=656 nm), green (e=546 nm) and blue (F=486 nm) wavelengths from glass manufacturers. Since the exact amount of deviation produced by a wedge prism is wavelength dependent, a certain amount of "color dispersion" or "chromatic abberation" will be introduced when prisms are used for steering white light. This is illustrated in FIG. 3(*a*).

With reference to FIG. 3(*a*), if a beam of polychromatic light passes through a wedge prism, the colors will separate (This phenomenon is highly exaggerated in FIG. 3(*a*) for the purpose of illustration). It is common to calculate the deviation angle $\alpha$ of a wedge prism at the green e wavelength. The difference between red C and blue F wavelength deviations will be considered as chromatic error or dispersion error.

Figure 3B:
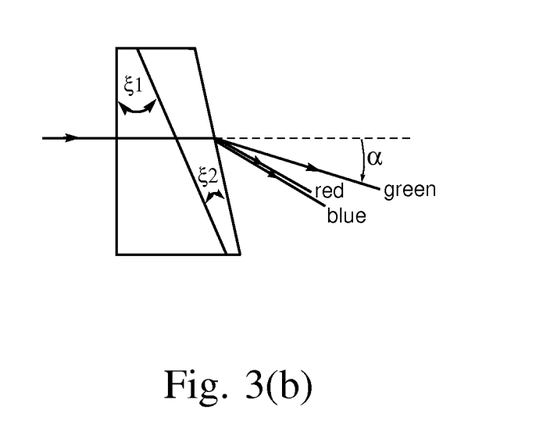
FIG. 3(b) is a side view showing color dispersion in an achromatic prism.

Chromatic error is significantly reduced if an achromatic prism is used. With reference to FIG. 3(*b*), an achromatic prism is made of two different glass types and is characterized by two apex angles $\xi_1$ and $\xi_2$. The glasses and the apex angles are chosen such that two wavelengths (usually the red C and the blue F standard wavelengths) exit the prism at the same deviation angle. A small difference between the deviation angle of the green e wavelength and the common deviation angle of the other two wavelengths will still remain. Persons skilled in the art of optical engineering would be familiar with the design of achromatic prisms. Therefore, it will be unnecessary to enter into a detailed exposition here.

Telescopic gun sights use an objective lens to form an image of the target as shown in FIG. 4(*a*). With reference to this figure, the objective lens 1 focuses the incoming light from the target and forms an image of the target on its focal plane 4. If we could shift this image up-down (or left-right) in the objective focal plane, the point of aim of the sight would change. However, the Risley beam steering system cannot be applied directly to the focused light beam created by an objective lens. This is due to the following two characteristics of the Risley system:

(a) The Risley beam steering system works best when it is applied to a collimated beam where light rays are parallel. If the system is placed in the path of a focused beam in an image-forming system, the prisms will introduce abberations such as astigmatism and coma.

Figure 2B:
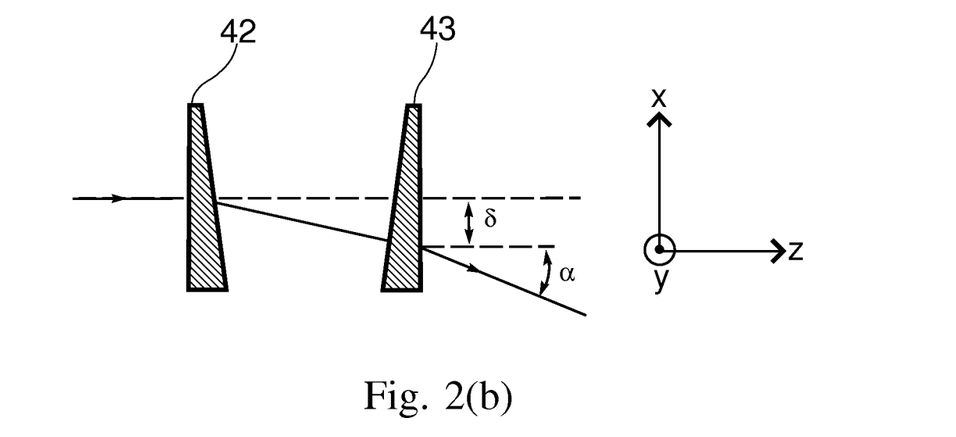
FIG. 2(b) is a side view showing general beam deviation characteristics of counter-rotating prims.

(b) The Risley beam steering system produces a lateral shift in the path of the beam as well. This is illustrated in FIGS. 2(*a*) and 2(*b*). As shown in these figures, the magnitude $\delta$ of the lateral shift depends on the deviation produced by the first prism and the distance between the prisms. As the first prism is rotated, the plane in which the lateral shift occurs also rotates around the optical axis.

To overcome the above difficulties, we place two lens elements 40 and 44 in the focused beam of the objective lens as shown in FIG. 4(*b*). With reference to this figure, the diverging (negative) lens 40 turns the focused beam produced by the objective lens into a collimated (parallel) beam. The converging (positive) lens 44 re-focuses this collimated light beam and forms an image of the target on the objective focal plane 4. Now, if a Risley beam steering system is placed in the collimated light region between lenses 40 and 44, no serious coma or astigmatism is introduced. In addition, the lateral beam shift 6 mentioned before will not have any affect on the position of the image formed by the converging lens 40. Thus, the arrangement shown in FIG. 4(*b*) allows the use of a Risley beam steering system for shifting the image produced by an objective lens without undesirable side effects.

FIG. 4(*c*) shows the beam steering characteristics of a Risley system placed in the collimated light formed by an a focal system comprising an objective lens followed by a diverging lens. Persons skilled in the art will recognize that the objective lens 1 together with the diverging lens 40 form a Galilean telescope. This telescope will have a magnification (or power) which we designate by N. If the Risley prisms 42 and 43 are rotated to steer the beam exiting the diverging lens by a degrees, the field of view of this telescope is steered by $\gamma$ degrees where $$\gamma = \frac{\alpha}{N}. \quad (4)$$

The magnification N depends on the focal ratio of the lenses used and can be any number larger than 1. Therefore, the afocal optical arrangement shown in FIG. 4(*c*) reduces the beam steering range of the Risley prism pair by a factor of N. This is a very desirable property for application in a riflescope since adjustments made to the point of aim are very small (commonly a few minutes of angle, each minute being one sixtieth of a degree).

Figure 4A:
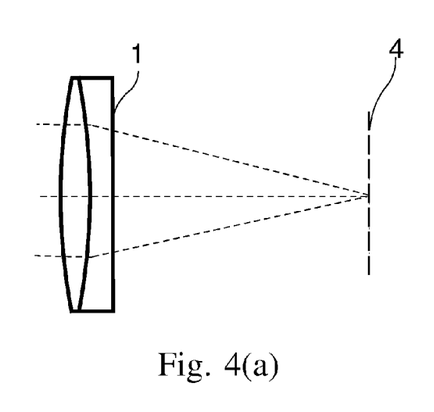
FIG. 4(a) illustrates the focused beam created by an objective lens.
Figure 4B:
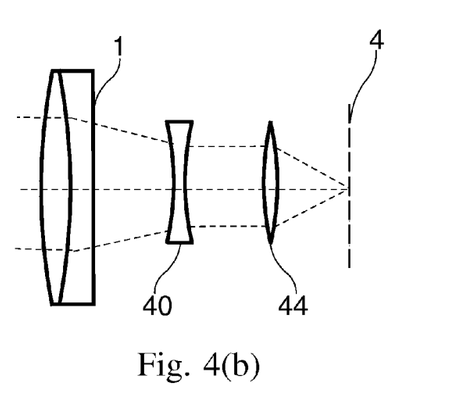
FIG. 4(b) shows how a collimated beam region can be created behind an objective lens.
Figure 4C:
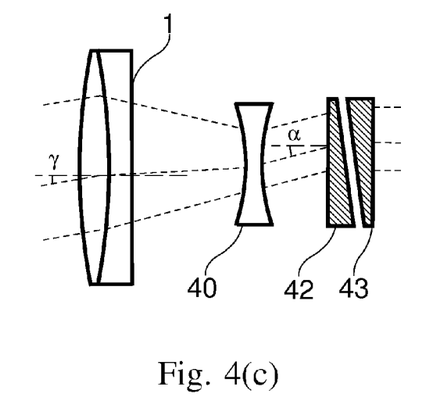
FIG. 4(c) shows beam steering characteristics of counter-rotating prisms when placed behind a Galilean afocal system.

Example 2 Consider the optical arrangement shown in FIG. 4(b) wherein the objective lens 1 has a diameter of 50 mm and a focal length of $f_1=200$ mm. If we place a diverging lens 40 with $f_2=50$ mm after the objective lens 1 such that the focal plane of the two lens are coplanar, the light beam focused by the objective will be collimated after passing through the diverging lens. For this arrangement $N=f_1/f_2=4$. If we position the Risley beam steering system described in Example 1 after the diverging lens 40, we can create an adjustment in the field of view of the telescopic sight in the amount of $\pm2°/4=\pm0.5°$. This adjustment range which is equivalent to $\pm30$ minutes of angle (MOA) is quite sufficient for a telescopic gun sight used in many hunting and sports shooting applications.

Figure 4D:
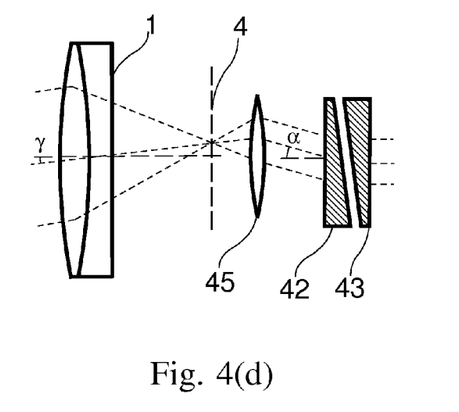
FIG. 4(d) shows beam steering characteristics of counter-rotating prisms when placed behind a Keplerian afocal system.

FIG. 4(d) shows a second method for creating a collimated beam region behind an objective lens. In this method, a converging (positive) lens 45 is positioned on the optical axis after the focal plane 4 of the objective lens 1. By choosing the power and the position of lens 45, a collimated light beam can be formed as shown in FIG. 4(d). Persons skilled in the art will recognize that the objective lens 1 together with the converging lens 45 form a Keplerian telescope. This telescope will have a magnification N depending on the focal ratio of lenses 1 and 45. A pair of Risley prisms 42 and 43 may be placed in the collimated beam region after lens 45 and rotated to steer the beam exiting lens 45 by a degrees. This will result in the field of view of the Keplerian telescope formed by lenses 1 and 45 to be steered by γ digress. The relation between α and γ is the same as given in (4) above.

Another advantage of placing the Risley beam steering system after the objective lens (in arrangements such as those shown in FIG. 4(c) or 4(d)) is that the size of the wedge prisms needed will be much smaller than the diameter of the objective lens. This is because the diameter of the beam passing through the Risley prisms will be reduced by a factor of N. For instance, in the system described in Example 2, the diameter of the beam passing through the prisms will be 50 mm/4=12.5 mm. Therefore, wedge prisms with a diameter of about 15 mm will be sufficient.

In the next section, we will introduce two preferred embodiment of the invention based on the teachings and principles described above.

A. First Embodiment of the Invention

Figure 5A:
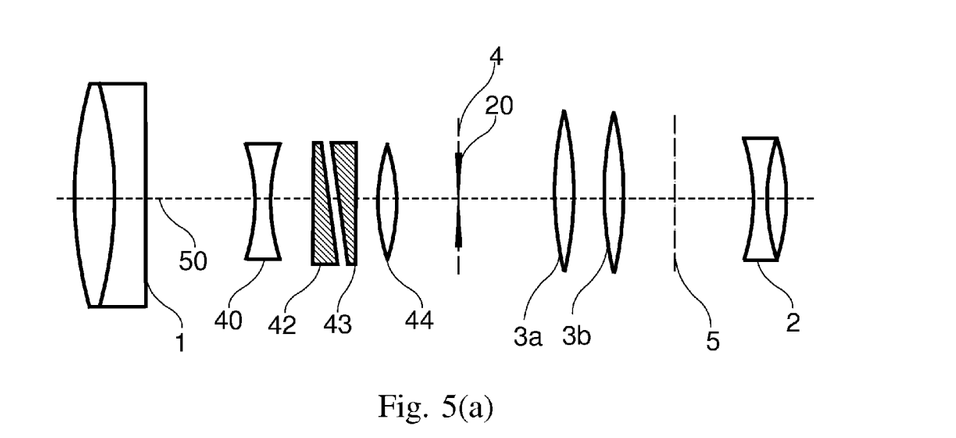
FIG. 5(a) is a side view schematic depicting the arrangement of elements in a first embodiment of the invention.
Figure 5B:
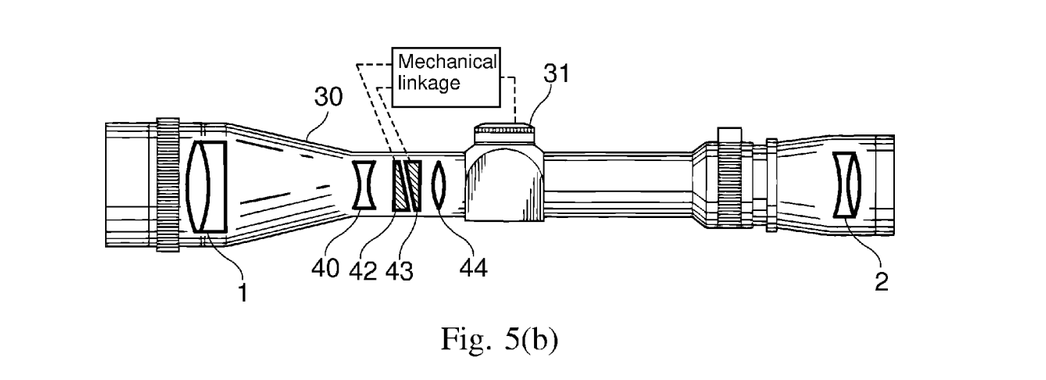
FIG. 5(b) is a side view schematic depicting housing and mechanical linkage means according to the first embodiment of the invention.

A first embodiment of the invention is shown in FIGS. 5(a) and 5(b). With reference to FIG. 5(a), a telescopic sight includes an objective lens 1 which forms a first image of the target on the objective focal plane 4. The objective lens has an optical axis 50 which defines the optical axis of the subsequent components as well. The first image produced by the objective lens is upside down and laterally reversed. An image-erecting means comprising a pair of lenses 3a and 3b relay this first image to the eyepiece focal plane 5 and form a second, upright and laterally correct image there. The eyepiece 2 takes this second image and produces a virtual magnified image for the shooter to see.

A reticle 20 may be placed at the objective focal plane 4 or at the eyepiece focal plane 5. In FIG. 5(a), the reticle is shown to be mounted coplanar with the objective focal plane 4. In either case, the shooter will see an image of the reticle superimposed on the image of the target.

A pair of Risley prisms 42 and 43 are placed on the optical axis after the objective lens 1 and before the objective focal plane 4. The prisms are mounted such that they are rotatable and their axis of rotation is coaxial with the optical axis. A diverging lens 40 is positioned before the Risley prisms to convert the focused beam produced by the objective lens 1 into a collimated beam before entering the prisms. A converging lens 44 is positioned after the prisms to convert the collimated beam back into a focused beam for forming an image on the objective focal plane 4.

With reference to FIG. 5(b), the telescopic sight may further include a housing 30 to contain and hold the optical components. A mechanical linkage means attached to a knob 31 is used to allow the shooter to rotate the Risley prisms 42 and 43 around the optical axis and in opposite directions. Rotation of the Risley prisms 42 and 43 causes the image formed on the objective focal plane 4 to shift with respect to the reticle 20 in a plane perpendicular to the optical axis. This, in turn, adjusts the telescopic sight's point of aim.

Details of the mechanical linkage means are not essential to the present invention. Persons skilled in the art would be familiar with the design of a suitable mechanical linkage means that can rotate the Risley prisms 42 and 43 in opposite directions when the external knob 31 is rotated by the shooter.

To use the telescopic sight described in this embodiment, an operator (shooter) places his eye at the rear end of the telescopic sight shown in FIG. 5(b) and points the sight towards a target. He will see a virtual image of the target with an image of the reticle superimposed. This enables him to determine his point of aim on the target. To adjust the point of aim, the shooter turns the knob 31 which, via the mechanical linkage means, rotates the Risley prisms in opposite directions around the optical axis. Rotation of the prisms will shift the image of the target on the reticle and adjust the point of aim.

B. Second Embodiment of the Invention

Figures 6A, 6B:
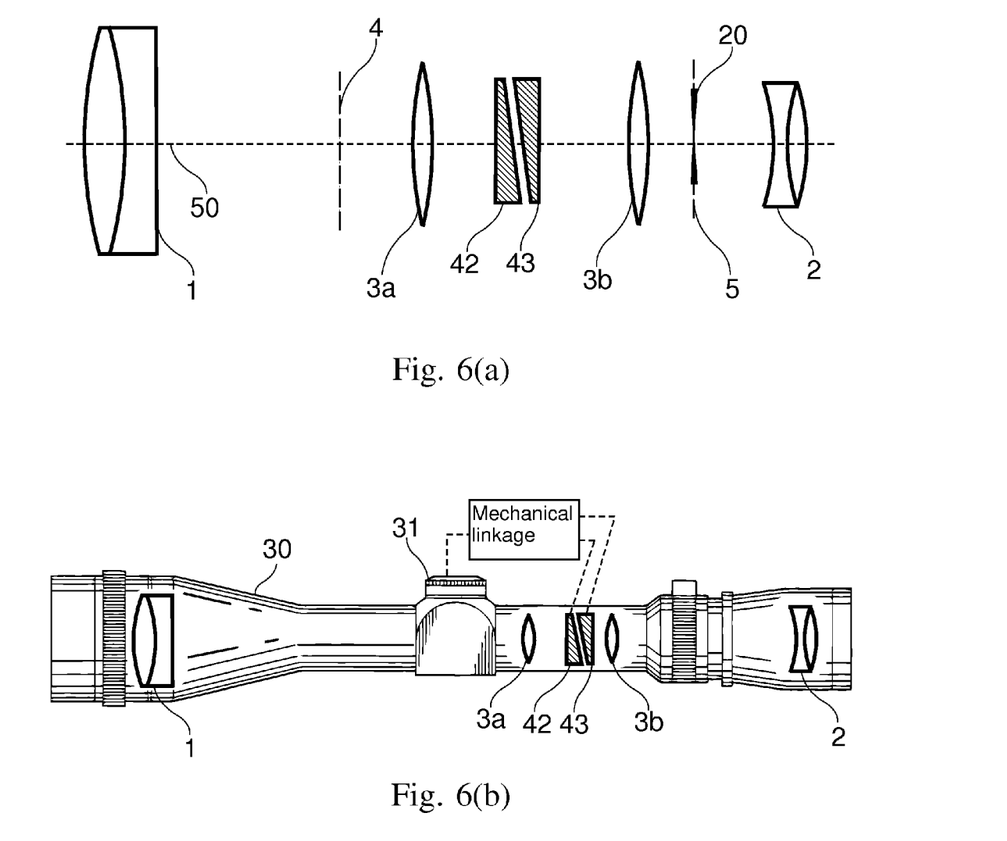

A second embodiment of the invention is shown in FIGS. 6(a) and (b). With reference to FIG. 6(a), a telescopic sight includes an objective lens 1 which forms a first image of the target on the objective focal plane 4. The objective lens has an optical axis 50 which defines the optical axis of the subsequent components as well. The first image produced by the objective lens is upside down and laterally reversed. An image-erecting means comprising a pair of converging lenses 3a and 3b relays this first image to the eyepiece focal plane 5 and forms a second, upright and laterally correct image there. The eyepiece 2 takes this second image and produces a virtual magnified image for the shooter to see. A reticle 20 is mounted coplanar with the eyepiece focal plane 5 to designate the point of aim. The shooter will see the reticle being superimposed on the image of the target.

A pair of Risley prisms 42 and 43 are positioned on the optical axis between the relay lenses 3a and 3b that form the image erecting means. The position of relay lenses 3a and 3b on the optical axis and their converging power are chosen such that the light beam is collimated in the region between them. The Risley prisms are mounted such that they are rotatable and their axis of rotation is coaxial with the optical axis 50.

With reference to FIG. 6(b), the telescopic sight may further comprise a housing 30 to contain and hold the optical components. A mechanical linkage means connects the external knob 31 to the Risley prisms 42 and 43. The mechanical linkage means is designed such that the shooter can rotate the Risler prisms in opposite directions by rotating the knob 31. Rotation of Risley prisms shifts the image of the target on the reticle and adjusts the point of aim of the telescopic sight.

Details of the mechanical linkage means are not essential to the present invention. Persons skilled in the art would be familiar with the design of a suitable mechanical linkage means that can rotate the Risley prisms 42 and 43 in opposite directions when the external knob 31 is rotated by the shooter.

To use the telescopic sight described in this embodiment, an operator (shooter) places his eye at the rear end of the telescopic sight shown in FIG. 6(*b*) and points the sight towards a target. He will see a virtual image of the target with an image of the reticle superimposed. This enables him to determine his point of aim on the target. To adjust the point of aim, the shooter turns the external knob 31 which, via the mechanical linkage means, rotates the Risley prisms 42 and 43 in opposite directions around the optical axis of the sight. This will shift the image of the target formed on the reticle and will provide adjustment for the point of aim.

C. Advantages

Based on the above descriptions of some embodiments of the invention, a number of advantages of one or more aspects over prior art are readily apparent:

1. The adjustment range provided by the mechanical methods used in the prior art are limited due to the finite physical size of the scope's main tube. In contrast, the optical adjustment method described in this invention allows for virtually any amount of elevation or windage adjustment in a telescopic gun sight.
2. The adjustment range provided by the mechanical methods used in the prior art become dependent near their maxima due to the circular shape of a riflescope's main tube. In contrast, the optical adjustment method described in this invention can produce completely independent adjustments for elevation and windage.
3. It is possible to adapt the invention to use multiple Risley beam steering systems in tandem. A multi-stage implementation would allow for quick setting of large adjustment values using separate "fine-tuning" and "coarse-tuning" knobs.
4. By positioning the Risley beam steering system after the objective lens inside the telescopic sight, the invention allows for the use of smaller and lighter wedge prisms.
5. By using rotating wedge prims instead of linearly moveable prims, the invention allows for a more compact optical adjustment module inside a telescopic sight.
6. By positioning the rotating wedge prims in collimated light, the invention eliminates optical abberations such as coma and astigmatism.

These and other advantages of one or more aspects may now be apparent to the reader from a consideration of the foregoing description and accompanying drawings.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:

1. For simplicity and brevity, we have discussed and illustrated adjustment in only one direction in the description of the embodiments above. It is understood that by applying knowledge within the skill of the art, one can readily modify and/or adapt the methodology described in this invention for adjusting a telescopic sight's point of aim in both vertical and horizontal directions. For instance, two pairs of Risley prisms may be positioned in tandem between the lenses 40 and 44 to provide adjustment in both x and y directions in the first embodiment of the invention. Similarly, one may place two pairs of Risley prisms between the relay lenses 3*a* and 3*b* in the second embodiment of the invention to obtain independent elevation and windage adjustment.
2. To reduce optical abberations, one may use achromatic prisms in the Risley beam steering system. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A telescopic sight for designating a weapon's point of aim when pointed at a target, comprising:
   a. an objective lens for forming a first image of the target, said objective lens having a first focal plane and an optical axis,
   b. an image-erecting means for converting said first image into an upright and laterally-correct second image, said image erecting means being positioned on the objective optical axis after said objective lens,
   c. an eyepiece lens for converting said second image into a virtual third image of the target for convenient viewing by an operator, said eyepiece lens having a second focal plane, said eyepiece lens being positioned on the objective optical axis after said image erecting means,
   d. a reticle for indicating the point of aim, said reticle being positioned coplanar with either said first focal plane or said second focal plane,
   e. a diverging lens and a converging lens, said diverging lens being positioned on the objective optical axis between said objective lens and said first focal plane, said converging lens being positioned on the objective optical axis between said diverging lens and said first focal plane, and
   f. a first wedge prism and a second wedge prism, said first wedge prism and said second wedge prism being positioned on the objective optical axis between said diverging lens and said converging lens, said first wedge prism and said second wedge prism being rotatable around an axis of rotation, said axis of rotation being coaxial with the objective optical axis, said first wedge prism rotation and said second wedge prism rotation being in opposite directions,
   whereby the operator can view and use said third image of the target for the purpose of aiming and adjust his point of aim by adjusting the rotation of said first wedge prism and said second wedge prism.

2. The telescopic sight of claim 1 wherein said first wedge prism and said second wedge prism are achromatic prisms.

3. A telescopic sight for designating a weapon's point of aim when pointed at a target, comprising:

a. an objective lens for forming a first image of the target, said objective lens having a first focal plane and an optical axis,
b. an image-erecting means for converting said first image into an upright and laterally-correct second image, said image erecting means being positioned on the objective optical axis after said objective lens, said image erecting means comprising a first converging lens and a second converging lens,
c. an eyepiece lens for converting said second image into a virtual third image of the target for convenient viewing by an operator, said eyepiece lens having a second focal plane, said eyepiece lens being positioned on the objective optical axis after said image erecting means,
d. a reticle for indicating the point of aim, said reticle being positioned coplanar with said second focal plane, and
e. a first wedge prism and a second wedge prism, said first wedge prism and said second wedge prism being positioned on the objective optical axis between said first converging lens and said second converging lens, said first wedge prism and said second wedge prism being rotatable around an axis of rotation, said axis of rotation being coaxial with the objective optical axis, said first wedge prism rotation and said second wedge prism rotation being in opposite directions, whereby the operator can view and use said third image of the target for the purpose of aiming and adjust his point of aim by adjusting the rotation of said first wedge prism and said second wedge prism.

4. The telescopic sight of claim 3 wherein said first wedge prism and second wedge prism are achromatic prisms.

\* \* \* \* \*